US009015017B2

(12) United States Patent
Maurin

(10) Patent No.: US 9,015,017 B2
(45) Date of Patent: Apr. 21, 2015

(54) METHOD AND TOOL FOR AIDED AIRCRAFT DESIGN USING A CRITERION OF OPERATIONAL AVAILABILITY

(75) Inventor: Thomas Maurin, Plaisance du Touch (FR)

(73) Assignee: AIRBUS Operations S.A.S., Toulouse (FR)

( * ) Notice: Subject to any disclaimer, the term of this patent is extended or adjusted under 35 U.S.C. 154(b) by 1056 days.

(21) Appl. No.: 13/037,860

(22) Filed: Mar. 1, 2011

(65) Prior Publication Data
US 2011/0218783 A1 Sep. 8, 2011

(30) Foreign Application Priority Data

Mar. 4, 2010 (FR) ...................................... 10 51573

(51) Int. Cl.
G06G 7/48 (2006.01)
G06F 11/30 (2006.01)
G06F 17/50 (2006.01)
G06Q 30/06 (2012.01)

(52) U.S. Cl.
CPC ........ *G06F 17/5095* (2013.01); *G06F 2217/02* (2013.01); *G06Q 30/06* (2013.01)

(58) Field of Classification Search
CPC .... G06F 17/5095; G06F 11/008; G06Q 10/20
USPC .................................................... 703/1, 2, 8
See application file for complete search history.

(56) References Cited

U.S. PATENT DOCUMENTS

| 6,751,536 | B1* | 6/2004 | Kipersztok et al. .......... 701/31.6 |
| 6,782,346 | B2* | 8/2004 | Bond et al. .................... 702/183 |
| 7,826,943 | B2* | 11/2010 | Yu et al. ....................... 701/31.2 |
| 7,865,278 | B2* | 1/2011 | Underdal et al. ............. 701/31.8 |
| 7,937,280 | B1* | 5/2011 | Leung et al. ...................... 705/6 |
| 8,560,376 | B2* | 10/2013 | Lienhardt .................... 705/7.38 |
| 8,645,113 | B2* | 2/2014 | Sweers .............................. 703/8 |
| 2002/0165696 | A1* | 11/2002 | Bond et al. .................... 702/183 |
| 2004/0111197 | A1* | 6/2004 | Kipersztok et al. ............. 701/29 |
| 2005/0192963 | A1* | 9/2005 | Tschiegg et al. .................. 707/9 |
| 2006/0058985 | A1* | 3/2006 | Arslan et al. ...................... 703/2 |
| 2006/0089920 | A1* | 4/2006 | Ramesh et al. ............... 705/400 |
| 2007/0035901 | A1* | 2/2007 | Albrecht et al. ................ 361/61 |

(Continued)

FOREIGN PATENT DOCUMENTS

EP 1 178 377 A1 2/2002

OTHER PUBLICATIONS

French Preliminary Search Report issued Nov. 3, 2010, in Patent Application No. 1051573.

(Continued)

*Primary Examiner* — Akash Saxena
(74) *Attorney, Agent, or Firm* — Oblon, McClelland, Maier & Neustadt, L.L.P.

(57) ABSTRACT

A method for the computer-aided design of an aeronautic system forming all or part of an aircraft, using a criterion of maintenance time cost over a given period of use. The cost is computed as the weighted sum of a first component representing the mean flight time lost during this period, a second component representing the mean unscheduled maintenance time for this system during said period, and a third component representing the scheduled maintenance time for this system throughout said period. The configuration corresponding to the lowest time cost is then selected.

10 Claims, 3 Drawing Sheets

(56) References Cited

U.S. PATENT DOCUMENTS

| | | | | |
|---|---|---|---|---|
| 2008/0172268 A1* | 7/2008 | Wingenter | | 705/7 |
| 2010/0010794 A1* | 1/2010 | Sweers | | 703/8 |
| 2010/0017241 A1* | 1/2010 | Lienhardt | | 705/8 |
| 2011/0218783 A1* | 9/2011 | Maurin | | 703/2 |
| 2014/0278245 A1* | 9/2014 | Voigt | | 702/182 |

OTHER PUBLICATIONS

Tore Markeset, et al., "R&M and Risk-Analysis Tools in Product Design, to Reduce Life-Cycle Cost and Improve Attractiveness", Proceedings of the Annual Reliability and Maintainability Symposium, XP010531046, Jan. 22, 2001, pp. 116-122.

Michael K. Lappin, "Supportability Evaluation Prediction Process", Proceedings of the Annual Reliability and Maintainability Symposium, XP010072414, Jan. 26, 1988, pp. 102-107.

Timothy J. Wilmering, et al., "Assessing the Impact of Health Management Approaches on System Total Cost of Ownership", Aerospace Conference, XP031330554, Mar. 5, 2005, pp. 3910-3920.

Silke Draber, "Optimizing Fault Tolerance in Embedded Distributed Systems", IEEE Micro, XP002158475, Jul. 1, 2000, pp. 76-84.

Mathieu Glade, Modelling life cycle costs: predicting maintenance costs and reliability, application to aeronautics, Jan. 2005, 227 pgs.

* cited by examiner

METHOD AND TOOL FOR AIDED AIRCRAFT DESIGN USING A CRITERION OF OPERATIONAL AVAILABILITY

TECHNICAL FIELD

The present invention generally concerns the field of aided design in aeronautics.

STATE OF THE PRIOR ART

Methods for designing an aircraft or part of an aircraft are well known in the state of the art. In particular, it is known how to design an avionics platform i.e. all the on-board computing and communication means used to carry out the functions of an aircraft, whether this platform has recourse to a dedicated architecture or, as more recently, to an integrated modular architecture (IMA). For example, a method for the aided design of an avionics platform with IMA architecture can be found in French application no 09 53267 filed on behalf of the present applicant.

The design methods under consideration generally take into account functional constraints such as the functions to be performed by the avionics system, and non-functional constraints such as the levels of safety and availability required by the different items of equipment.

On the other hand, these methods do not properly take into account a factor which has become critical for the assessment of the quality of an aircraft, namely the time during which it can be operational. For a given lifetime, an aircraft effectively only passes a fraction of this time in flight, hereunder called the rate of operational availability. This availability notably depends on the time during which the aircraft is subjected to preventive or corrective maintenance operations. It is possible for example to design two systems e.g. different avionics platforms meeting one same set of functional constraints but leading to different rates of operational availability.

Traditionally, the volume of maintenance operations is evaluated a posteriori, i.e. for an aircraft that is already designed, even manufactured, and in terms of financial cost. For example, the direct maintenance cost method, DMC, is widely used for this financial cost. A presentation of the DMC method and different other evaluation methods can be found in the thesis by Mr. Glade titled « Modelling life cycle costs: predicting maintenance costs and reliability, application to aeronautics» , January 2005. This evaluation of costs is currently not easy to take into consideration when choosing an aircraft architecture. The DMC method uses purely financial parameters such as inflation, payroll costs, interest rates, etc., which for the most part are removed from technical choices guiding design. In addition, the DMC method does not take into account important parameters such as down-time when the aircraft is undergoing preventive or corrective maintenance.

Maintenance operations can be programmed at regular intervals to check and, if necessary, replace or update some material or software elements (in which case the term preventive maintenance is used) or it can be initiated further to a failure of an element (in which case the term corrective maintenance is used). In recent aircraft, most equipment is provided with Built-In Test Equipment (BITE), to ensure monitoring and to diagnose failures. However, it can happen that an item of built-in test equipment is itself faulty and unduly signals ill-functioning of equipment of which it is in charge, giving a spurious alert message. The time spent verifying the equipment under consideration and diagnosing the test equipment error is currently taken into account neither in maintenance cost evaluation nor in the aircraft design phase.

In addition, at the present time the maintenance of structural elements of the aircraft is not given homogeneous consideration together with system maintenance.

A first objective of the present invention is to propose a method for the computer-aided design of an aircraft or part of an aircraft, which takes into account the operational availability rate of this aircraft.

A second objective of the present invention is to allow a designer to visualize and rapidly compare a plurality of architectures of an aircraft, on the basis of a criterion of operational availability.

DISCLOSURE OF THE INVENTION

The present invention is defined by a method for the computer-aided design of an aeronautic system forming all or part of an aircraft. According to this method, a plurality of different configurations for this system are extracted from a database, and for each of these configurations, a maintenance time cost for said system is estimated for a given period of use by means of the following steps:
  calculating a first component equal to the mean flight time lost by the aircraft, subsequent to a system failure during said period of use;
  calculating a second component equal to the mean unscheduled maintenance time caused by a system failure during said period of use;
  calculating a third component equal to the scheduled maintenance time for this system throughout said period of use;
  obtaining said time cost as a weighted sum of the first, second and third components, using a first, second and third cost factor, respectively; and the configuration of the system with the lowest maintenance time cost is chosen.

The first component is advantageously calculated from the probability that the system will be affected by a failure during said period of use preventing the aircraft from flying, from the mean diversion time of the aircraft and from the mean verification/repair time of the system on the ground.

The second component is advantageously calculated from the probability that the system will be affected by a failure during said period of use which, although it does not prevent the aircraft from flying, it nevertheless requires an unscheduled maintenance operation, and on the mean duration of this maintenance operation.

The third component is advantageously calculated from the number of scheduled maintenance operations for the system throughout said period of use, and on the mean duration of these operations.

Typically, the first cost factor is higher than the second cost factor, which itself is higher than the third cost factor.

According to one embodiment, by means of a graphical interface the time cost of maintenance is represented for at least one configuration of the system, the first, second and third components each being represented by a bar of length proportional to their weighted value, the bars for the different components being concatenated to evidence said time cost of maintenance.

If said system comprises a plurality of equipment items, at least one bar associated with a component can be fractionated into blocks so as to represent the respective contributions of the different items of equipment and/or different types of failures to this component.

Advantageously the graphical interface, for each component, also represents a worst case situation, the worst case representation for the first component being the maximum lost flight time for a system failure preventing the aircraft from flying, for the second component it is the maximum unscheduled maintenance time for a failure not preventing the aircraft from flying, and for the third component it is the scheduled maintenance time for the system throughout said period of use increased by a risk margin.

Said period of use may be the lifetime of the aircraft for example.

The invention also concerns a computer program which, when run on a computer, implements the method for computer-aided design set forth above.

BRIEF DESCRIPTION OF THE DRAWINGS

Other characteristics and advantages of the invention will become apparent on reading preferred embodiments of the invention with reference to the appended figures, amongst which.

DETAILED DESCRIPTION OF PARTICULAR EMBODIMENTS

In the remainder hereof the term « aeronautic system » will be used to designate an aircraft or only part of an aircraft, e.g. an on-board system or an avionics platform such as defined above. This aeronautic system comprises one or more items of equipment, each item of equipment possibly being the subject of maintenance. For example said item of equipment may be a LRU (Line Replaceable Unit), a structural element, a test module.

Figure 1A:
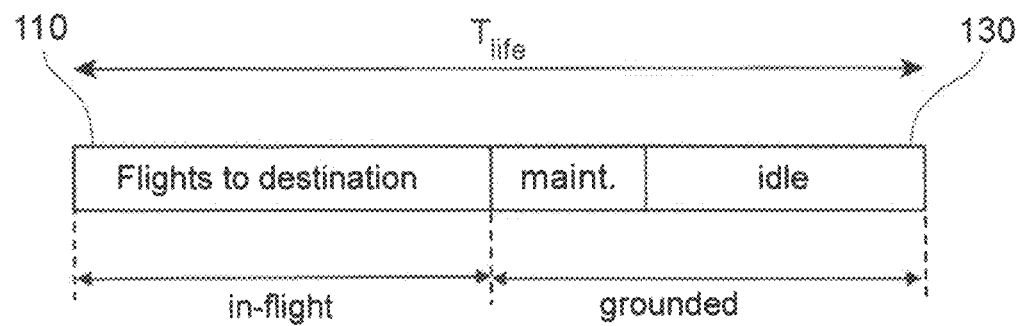
FIG. 1A gives a breakdown of the lifetime of an aircraft under ideal operating conditions.

In the ideal case of normal operation illustrated FIG. 1A, the lifetime of an aircraft $T_{life}$, can be divided into two parts, a first part 110 during which the aircraft is in flight and a second part 120 during which it is on the ground, either for scheduled maintenance operations, or simply because it is idle. By idle is meant here that the aircraft is in condition to fly but is not in an active operating phase; for example when it is embarking or disembarking passengers, fuelling or is not in use.

Figure 1B:
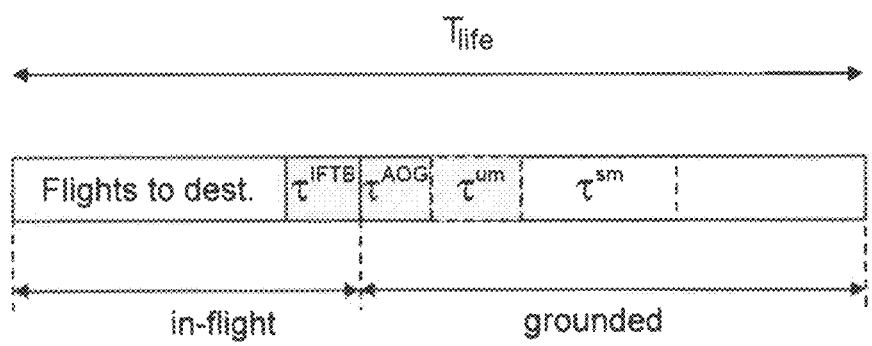
FIG. 1B gives a breakdown of the lifetime of an aircraft under real conditions of use.

In practice however, under real operating conditions as illustrated FIG. 1B, the time during which the aircraft is in flight towards its destination, i.e. the duration of the first part, can be shortened by a first duration $\tau^{IFTB}$ and a second duration $\tau^{AOG}$.

The first duration $\tau^{IFTB}$ corresponds to a phase that is commonly designated IFTB for In Flight Turn Back, during which the aircraft is diverted and must return to its departure airport subsequent to an equipment failure detected in flight, preventing continuation of the initially planned mission. The time during which an aircraft is diverted is also called the diversion time.

The second duration $\tau^{AOG}$ corresponds to a phase called AOG (Aircraft On Ground) during which the aircraft is grounded further to a failure of « NO GO » type suffered by an item of equipment.

By « NO GO » failure of an item of equipment (or of a system) is meant that the item of equipment (or system) affected by the failure is not an item in the Minimum Equipment List—MEL which comes under the group of equipment whose ill-functioning does not jeopardize the safety of the aircraft for the type of envisaged flight. In other words, an aircraft with an item of equipment that is affected by a failure of « NO GO » type is not given flight authorization.

In the remainder hereof, $\tau^{NF}=\tau^{IFTB}+\tau^{AOG}$ shall be used to designate the flight time lost through failures not authorizing flight takeoff or continuation.

Under real operating conditions, an aircraft may also undergo unscheduled maintenance operations. For example, if an item of equipment is affected by a failure of « GO » type, i.e. if this failure does not affect the availability of the aircraft and therefore does not prevent it from flying, the verification and possibly the replacement of this item of equipment must be carried out either at the time of an unscheduled maintenance operation or it can wait until the next scheduled maintenance operation. The time spent on unscheduled maintenance operations shall be denoted $\tau^{um}$ and for the time spent on scheduled maintenance operations $\tau^{sm}$ will be used.

For a given period of use, for example the lifetime of an aircraft, a set of probabilities can be related with each item of equipment $C_i$ of an aeronautic system:

$p_i^{NFV}$: the probability that failure of equipment $C_i$ leading to an IFTB phase (interrupting the mission in progress) will be detected in flight during the period of use under consideration;

$p_i^{NFG}$: the probability that a failure of « NO GO » type of equipment $C_i$ will be detected on the ground, during the period of use under consideration;

$p_i^{um}$: the probability that equipment $C_i$ will be affected by a failure of « GO » type during the period of use under consideration, requiring an unscheduled maintenance operation.

These different probabilities can be estimated heuristically, by means of feedback from experience on past uses of this item of equipment.

Each item of equipment $C_i$ can be associated with a maintenance time cost over the period of use:

$$\theta_i = F(C_i) = w_i^{NF}(p_i^{NFV}\tau_i^{NFV} + p_i^{NFG}\tau_i^{NFG}) + w_i^{um}p_i^{um}\tau_i^{um} + w_i^{sm}v_i^{sm}\tau_i^{sm} \quad (1)$$

where F(.) is a time cost function, and $\tau_i^{NFV}$ is the sum of the aircraft diversion time and grounding time for verification and, if necessary, repair of the equipment ($\tau_i^{NFV}$ is therefore partly taken into account for the calculation of $\tau^{IFTB}$ and of $\tau^{AOG}$), said grounding time possibly including the time needed to obtain replacement equipment. The times envisaged above are taken at their mean value;

$\tau_i^{NFG}$ is the mean time during which the aircraft is grounded for verification and, if necessary, repair of the equipment ($\tau_i^{NFG}$ is therefore taken into account for the calculation of $\tau^{AOG}$), the latter possibly including the mean time to obtain replacement equipment;

$\tau_i^{um}$ is the mean time spent on verification and, if necessary, repair of the this item of equipment when it is affected by a failure of « GO » type which is to be treated during an unscheduled maintenance operation ($\tau_i^{um}$ enters into the calculation of $\tau^{um}$);

$\tau_i^{sm}$ is the time spent on verification and, if necessary, repair of this equipment during a scheduled maintenance operation ($\tau_i^{sm}$ enters into the calculation of $\tau^{sm}$);
$v_i^{sm}$ is the number of scheduled maintenance operations for this item of equipment throughout the period of use; and $w_i^{NF}$, $w_i^{um}$, $w_i^{sm}$ are weights weighting the respective impacts of the different type of maintenance operations. In general, weight $w_i^{NF}$ is substantially greater than weight $w_i^{um}$, which itself is greater than weight $w_i^{sm}$.

The expression (1) can also be written:

$$\theta_i = w_i^{NF} p_i^{NF} \tau_i^{NF} + w_i^{um} p_i^{um} \tau_i^{um} + w_i^{sm} v_i^{sm} \tau_i^{sm} \qquad (2)$$

where $\tau_i^{NF} = \tau_i^{NFV} + \tau_i^{NFG}$ and $$p_i^{NF} = \frac{p_i^{NFV} \tau_i^{NFV} + p_i^{NFG} \tau_i^{NFG}}{\tau_i^{NFV} + \tau_i^{NFG}}.$$

The first term of (2) relates to lost flight time, the second term relates to unscheduled maintenance operations for the equipment, and the third term relates to maintenance operations scheduled by the equipment manufacturer.

According to one variant of embodiment, the cost function F(.) may also include costs other than maintenance costs, for example if the failure of said item of equipment leads to a major work overload for the crew or ground staff, a serious degradation in passenger comfort, etc. If $\kappa_i$ is used to denote the sum of these additional costs, expressed as time for reasons of homogeneity, the total cost for equipment $C_i$ is given by:

$$\theta_i = w_i^{NF} p_i^{NF} \tau_i^{NF} + w_i^{um} p_i^{um} \tau_i^{um} + w_i^{sm} v_i^{sm} \tau_i^{sm} + \kappa_i \qquad (3)$$

The calculation of the cost function is exemplified below for some particular cases.

It is first assumed that the aeronautic system is a functional system comprising two LRUs. If the loss of function suffered by this system amounts to a failure of « NO GO » type, but the loss by one of the LRUs is merely a failure of « GO » type, the maintenance time cost of the functional system can be obtained using:

$$\theta = w^{NF}(p^{NFV} \tau^{NFV} + p^{NFG} \tau^{NFG}) + w^{um} \sum_{i=1}^{2} p_i^{um} \tau_i^{um} + w^{sm} \sum_{i=1}^{2} p_i^{sm} \tau_i^{sm} \qquad (4)$$

where $p^{NFV}$ is the probability of loss of function in flight, $p^{NFG}$ is the probability of loss of this function on the ground, $\tau^{NFV}$ is the sum of the aircraft diversion time and grounding time, $\tau^{NFG}$ is the mean time for verifying/repairing the function under consideration, $p_i^{um}$, $v_i^{sm}$, $\tau_i^{um}$ and $\tau_i^{sm}$ have the meaning given above, for each of the LRUs.

Probability $p^{NFV}$ can be estimated as the product:

$$p^{NFV} = p_{21}^{loss} p_1^{loss} \qquad (5)$$

where $p_1^{loss}$ is the probability of failure of a first LRU and $p_{12}^{loss}$ is the probability of failure of the second LRU when the first has already failed. The probability $p_1^{loss}$ can be obtained from the Mean Time Between Failures (MTBF) for the LRU under consideration, more precisely as T/MTBF where T is the period of use.

Similarly, the probability $p_i^{um}$ can be obtained from the Mean Time Between Unscheduled Replacements (MTBUR), more precisely as T/MTBUR.

For each LRU, the time $\tau_i^{um}$ can be estimated as the time needed for a qualified technician to arrive at the aircraft, increased by the time needed to verify the LRU using technical documentation and diagnostic tooling, further increased by the time needed to gain physical access to the LRU and, when applicable, the time needed for replacement thereof. Evidently, these times are considered to be mean times and can be obtained by estimations, tests and feedback from experience.

The time $\tau_i^{sm}$ is the time needed to verify and if necessary replace the LRU during a scheduled maintenance operation.

By comparison, the maintenance time cost of each of the LRUs can be expressed in the form:

$$\theta_i = \frac{w^{NF}}{2}(p^{NFV} \tau^{NFV} + p^{NFG} \tau^{NFG}) + w^{um} p_i^{um} \tau_i^{um} + w^{sm} p_i^{sm} \tau_i^{sm} \qquad (6)$$

If the aeronautic system is a structural element of the aircraft, the maintenance time cost of this element over a given interval of use can be estimated using expression (1) in which the probability $p_i^{um}$ represents the probability of damage to the element leading to unscheduled inspection or repair of the element under consideration within this interval, whether the damage is due to corrosion, accident, or to mechanical fatigue. The probability of damage due to mechanical fatigue can be estimated using probabilistic mechanical methods for example. It will also be noted that the times $\tau_i^{um}$ and $\tau_i^{sm}$ each include an inspection time and maintenance time for the element.

Figure 2:
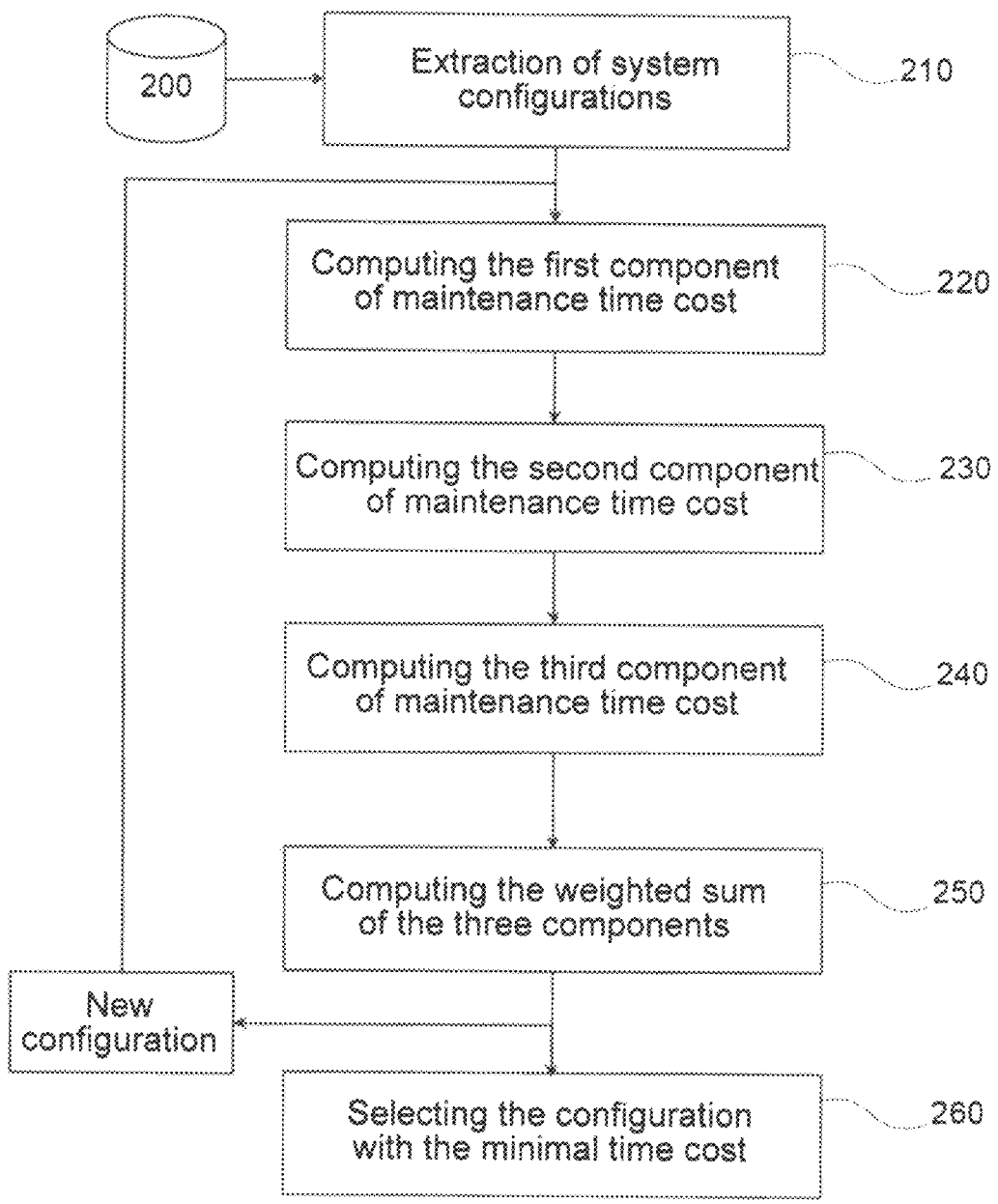
FIG. 2 is a flow chart of a method for the computer-aided design of an aeronautic system using a criterion of maintenance time cost.

FIG. 2 illustrates a computer-aided method for designing an aeronautic system, according to one embodiment of the invention. This method uses a criterion of operational availability of the aeronautic system, in that it takes into account the maintenance time cost thereof.

At a first step 210, a plurality of alternative configurations for the system under consideration is extracted from the database 200. These configurations may be different architectures for example of an avionic system, or different architectures of the aircraft structure. At all events, for each of said configurations, the aeronautic system comprises one or more items of equipment which may be the subject of maintenance.

Next, a loop is followed whereby the different configurations are each reviewed in turn. For each of the configurations, the time cost of maintenance for this system is estimated over a given period of use, taken as the weighted sum of a first component relating to loss of flight time, a second component relating to unscheduled maintenance operations, and of a third component relating to scheduled maintenance operations.

At step 220, the first component is computed in relation to the probability that the system will be affected, during the period of use, by a failure preventing the aircraft from flying, and in relation to the mean diversion time and verification/repair time of the system on the ground. In other words, the first component is equal to the mean lost flight time due to a system failure during the period of use under consideration.

At step 230, the second component is calculated in relation to the probability that the system will be affected, during the period of use, by a failure which, although it does not prevent the aircraft from flying, requires an unscheduled maintenance operation, and in relation to the mean duration of this maintenance operation. In other words, the second component is equal to the mean time of unscheduled maintenance subsequent to a system failure during the period of use under consideration. If the system comprises a plurality of equipment items, this mean time of unscheduled maintenance can be obtained as the sum of the mean unscheduled maintenance times for the different items of equipment.

At step 240, the third component is calculated in relation to the number of scheduled maintenance operations for the system throughout the period of use, and in relation to the mean duration of these operations. In other words, the third component is equal to the maintenance time scheduled for this system throughout the period of use under consideration. If the system comprises a plurality of items of equipment, this scheduled maintenance time may be obtained as the sum of the scheduled maintenance times for the different items of equipment.

At step 250, the maintenance time cost is calculated as being a weighted sum of the components calculated at steps 220, 230 and 240, using cost factors. The cost factor for the first component is substantially higher than the cost factor for the second component which itself is higher than the cost factor for the third component.

After calculating the maintenance time cost for each configuration of the system, at step 260 the configuration is chosen that has the lowest time cost.

According to one variant of embodiment, a viewing step is provided to visualize the time cost of the different system configurations and/or to view the configuration finally chosen at step 250, by means of a graphical interface.

FIG. 3A gives an exemplary representation of the maintenance time cost for an aeronautic system.

The diagram shows the three components of the time cost and, when applicable, the additional costs as explained in connection with expression (3).

Each component, as weighted by its cost factor, is illustrated by means of a graphical user interface GUI. Advantageously, each component is represented by a bar whose length is proportional to its weighted value, the bars for the different components preferably being concatenated to highlight the time cost of the system over the period of use under consideration. Optionally, a scale graduated in time units may be displayed facing the concatenated bars.

Figure 3:
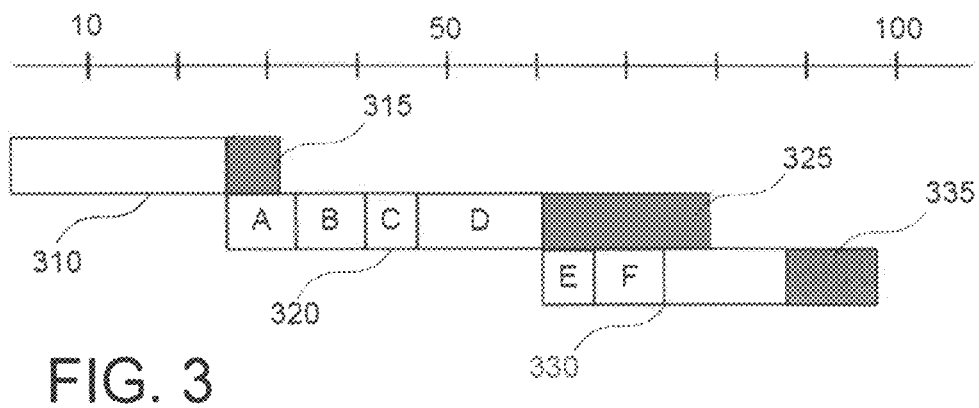
FIG. 3 is an exemplary illustration of the time cost of maintenance for an aeronautic system.

FIG. 3, by means of a bar 310, illustrates the first weighted component relating to lost flight time, a bar 320 represents the second weighted component relating to unscheduled maintenance time, and bar 330 represents the third weighted component relating to scheduled maintenance time. A break between each bar and/or a different colour for each bar advantageously allows a distinction to be made between the contributions of the weighted components towards the time cost of maintenance.

According to one variant, for each of the components, information is shown representing the worst case scenario. More precisely, for the first component, the worst case would be the maximum lost flight time $$\left(w^{NF}\max_i(\tau_i^{NFV})\right)$$

for a system failure preventing the aircraft from flying, and for the second component the worst case would be the maximum unscheduled maintenance time $$\left(w^{um}\max_i(\tau_i^{um})\right)$$

for a failure which does not prevent the aircraft from flying. Since the third component is of deterministic type, there is not strictly speaking a worst case to be envisaged. However, throughout the operation of an aircraft, the time originally scheduled between maintenance operations for this system may prove to be too long. The worst case then corresponds to a risk margin for the total scheduled maintenance time $$\left(\sum_i w^{sm}\tau_i^{sm}\right)$$

throughout the period of use.

References 315, 325, 335 denote the worst case situations for the first, second and third components of the time cost. For each worst case situation, the corresponding maximum time is indicated in the form of a risk margin relative to the expected value. For example, the maximum lost flight time is expressed as the length of bar 310 increased by the length of the margin 315. The advantage of said representation is that it allows a designer of the system to assess the time cost of maintenance visually and very rapidly, together with the cause and worst case situations.

Each bar relating to a component can be fractionated into blocks to represent the contributions made by the different components of the system and/or the different types of failures. As an illustration, using the example previously taken for a system comprising two LRUs, block A represents the contribution of the first LRU, block B the contribution of the second LRU, block C represents the share due to a spurious message from a test module, block D a contribution due to various failures, block E represents the share of scheduled maintenance relating to the updating of software/data retrieval from LRUs, block F the share of scheduled maintenance due to the replacement of storage batteries, etc.

The representation of the time cost of maintenance, such as illustrated FIG. 3, allows the designer to validate the choice of a configuration and/or easily to compare different possible configurations of a system.

Figure 4A:
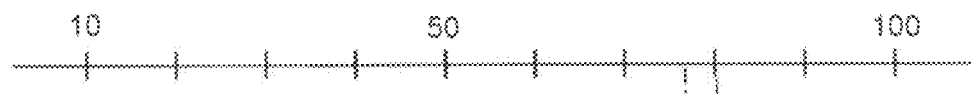
FIG. 4A illustrates the time cost of maintenance for an aeronautic system according to a first configuration.
Figure 4B:
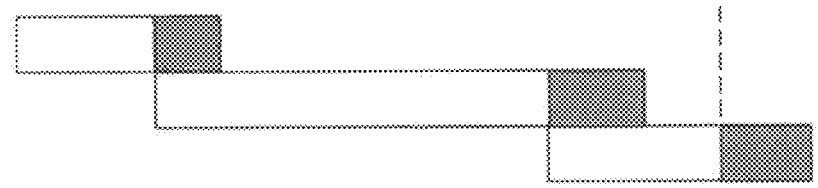
FIG. 4B illustrates the time cost of maintenance for said aeronautic system according to a second configuration.

FIGS. 4A and 4B illustrate the time cost of maintenance for an aeronautic system according to a first and a second configuration.

In the first configuration, the system comprises a single LRU, whereas in the second configuration the system consists of two independent LRUs identical to the first.

It will be noted that the second component has greater importance in the second configuration than in the first. This can essentially be accounted for by the fact that the probability of having a failure in one of the two LRUs (of « GO » type) is twice higher than having a failure in only one LRU (of « GO » type).

Similarly, the third component has greater importance in the second configuration than in the first, since the scheduled maintenance time for two LRUs is necessarily longer than for only one LRU.

On the other hand, the first component is of substantially lesser importance in the second configuration compared with the first, the loss of system function (assumed « NO GO » failure) being caused by the loss of the single LRU in the first case and by the combined loss of both LRUs in the second case.

In this example, the time cost of the system in the first configuration is lower than in the second configuration. The method according to the invention therefore selects the first configuration and, at the operator's request, displays the same on the graphical interface. Nevertheless, the operator may wish to visualize the time costs of different configurations that were not selected before validating this selection.

It is noted here that the risk margin for the first configuration is substantially greater in the first configuration than in the second configuration. In other words, under the hypothesis of loss of flight time, the worst case is distinctly more penalising in the first configuration than in the second. The operator may therefore decide not to validate the choice made by the method and to opt for the second configuration.

Finally, the type of representation in FIG. 3 allows rapid visualization of the impact on time cost of a modification to the system or of a change in maintenance policy. This may particularly be the case if it is envisaged to replace a system component (e.g. a LRU) by a more reliable component (high MTBF or MTBUR value) or to use a new anticorrosion technique for the structural elements. The impact of a different use of the aircraft (for example longer haul flights leading to longer diversion times) on the time cost of maintenance can easily be visualized in the same manner.

The man skilled in the art will appreciate that the compute-aided design method presented in the foregoing is implemented via software means performing the different steps in FIG. 2. These software means cooperate with a database in which the different configurations of an aeronautic system are stored, together with a graphical interface for the variant described with reference to FIG. 3.

The invention claimed is:

1. A computer-aided method implemented by a computer for designing an aeronautic system forming all or part of an aircraft, the computer-aided method comprising:
    extracting a plurality of different configurations of the system from a database;
    estimating by the computer, for each of the plurality of different configurations, a maintenance time cost of said system for a given period of use, the estimating including
        computing a first component equal to a mean flight time lost by the aircraft subsequent to a system failure during said period of use,
        computing a second component equal to a mean unscheduled maintenance time subsequent to a system failure during said period of use,
        computing a third component equal to a scheduled maintenance time for this the system throughout said period of use, and
        obtaining said time cost as a weighted sum of the first, second, and third components by a first cost factor, a second cost factor, and a third cost factor respectively;
    generating by the computer, based on the estimating, a graphical interface representing the maintenance time cost of at least one configuration of the system, the graphical interface representing the first component as a first part of a bar and representing a worst case situation for the first component, which corresponds to a maximum flight time lost subsequent to a system failure preventing the aircraft from flying, as a second part of the bar, the first part of the bar being distinguished from the second part of the bar; and
    selecting the configuration of the system having a lowest maintenance time cost.

2. The computer-aided design method according to claim 1, wherein the computing of the first component is computed from a probability that the system will be affected during said period of use by a failure preventing the aircraft from flying, from a mean diversion time of the aircraft, and from a mean time for verification/repair of the system on the ground.

3. The computer-aided design method according to claim 1, wherein the computing of the second component is computed from a probability that the system will be affected, during said period of use, by a failure which, although does not prevent the aircraft from flying, requires an unscheduled maintenance operation, and on a mean duration of the unscheduled maintenance operation.

4. The computer-aided design method according to claim 1, wherein the computing of the third component is computed from a number of scheduled maintenance operations for the system throughout said period of use, and from a mean duration of the scheduled maintenance operations.

5. The computer-aided design method according to claim 1, wherein the first cost factor is higher than the second cost factor, which is higher than the third cost factor.

6. The computer-aided design method according to claim 1, wherein the graphical interface represents each of the second and third components by a bar of length proportional to their weighted value, the bars for the different components being concatenated to highlight said time cost of maintenance.

7. The computer-aided design method according to claim 6, wherein said system includes a plurality of equipment items, and at least one bar associated with one component is fractionated into blocks so as to represent the respective contributions made by at least one of the different items of equipment and different types of failure to the component.

8. The computer-aided design method according to claim 6 or 7, wherein the graphical interface represents, for each of the second component and the third component, a worst case situation, a representation of the worst case situation for the second component corresponds to a maximum unscheduled maintenance time for a failure not preventing the aircraft from flying, and a representation of the worst case situation for the third component corresponds to a scheduled maintenance time for the system throughout said period of use increased by a risk margin.

9. The computer-aided design method according to claim 1, wherein said period of use is the lifetime of the aircraft.

10. A non-transitory computer-readable storage medium including computer executable instructions, wherein the instructions, when executed by a computer, cause the computer to perform a method for designing an aeronautic system forming all or part of an aircraft, the method comprising:
    extracting a plurality of different configurations of the system from a database:
    estimating, for each of the plurality of different configurations, a maintenance time cost of the system for a given period of use, the estimating including
        computing a first component equal to a mean flight time lost by the aircraft subsequent to a system failure during the period of use,
        computing a second component equal to a mean unscheduled maintenance time subsequent to a system failure during the period of use,
        computing a third component equal to the scheduled maintenance time for the system throughout the period of use,
        obtaining the time cost as a weighted sum of the first, second, and third components by a first cost factor, a second cost factor, and a third cost factor respectively;
    generating, based on the estimating, a graphical interface representing the maintenance time cost of at least one configuration of the system, the graphical interface representing the first component as a first part of a bar and representing a worst case situation for the first component, which corresponds to a maximum flight time lost subsequent to a system failure preventing the aircraft from flying, as a second part of the bar, the first part of the bar being distinguished from the second part of the bar; and selecting the configuration of the system having a lowest maintenance time cost.

* * * * *